US008996774B2

(12) United States Patent
Chew

(10) Patent No.: US 8,996,774 B2
(45) Date of Patent: Mar. 31, 2015

(54) PERFORMING EMULATED MESSAGE SIGNALED INTERRUPT HANDLING

(75) Inventor: Yen Hsiang Chew, Penang (MY)

(73) Assignee: Intel Corporation, Santa Clara, CA (US)

(*) Notice: Subject to any disclaimer, the term of this patent is extended or adjusted under 35 U.S.C. 154(b) by 328 days.

(21) Appl. No.: 13/534,511

(22) Filed: Jun. 27, 2012

(65) Prior Publication Data
US 2014/0006668 A1  Jan. 2, 2014

(51) Int. Cl.
G06F 13/24 (2006.01)

(52) U.S. Cl.
CPC ............................ G06F 13/24 (2013.01)
USPC ............................ 710/260; 710/263; 710/269

(58) Field of Classification Search
USPC ............................ 710/260, 262–266, 268–269
See application file for complete search history.

(56) References Cited

U.S. PATENT DOCUMENTS

| 7,325,084 | B1* | 1/2008 | Marmash et al. ............ 710/269 |
| 2002/0184328 | A1* | 12/2002 | Richardson et al. ........ 709/213 |
| 2003/0182484 | A1 | 9/2003 | Gaur et al. |
| 2006/0047877 | A1 | 3/2006 | Winkler et al. |
| 2006/0259658 | A1 | 11/2006 | Connor et al. |
| 2007/0005858 | A1* | 1/2007 | Shah et al. .................... 710/200 |
| 2008/0114916 | A1* | 5/2008 | Hummel et al. .............. 710/266 |
| 2010/0082866 | A1 | 4/2010 | White et al. |
| 2013/0275639 | A1* | 10/2013 | Chew ............................ 710/269 |
| 2014/0156950 | A1* | 6/2014 | Chew ............................ 711/146 |
| 2014/0189182 | A1* | 7/2014 | Chew ............................ 710/260 |
| 2014/0237144 | A1* | 8/2014 | Chew ............................ 710/50 |

OTHER PUBLICATIONS

International Application No. PCT/US11/59179, entitled "Method to Emulate Message Signaled Interrupts with Interrupt Data," filed Nov. 3, 2011 by Yen Hsiang Chew.
International Application No. PCT/US11/59184, entitled "Method to Emulate Message Signaled Interrupts with Multiple Interrupt Vectors," filed Nov. 3, 2011 by Yen Hsiang Chew.
International Searching Authority, "Notification of Transmittal of the International Search Report and the Written Opinion of the International Searching Authority," mailed Oct. 18, 2013, in International application No. PCT/US2013/046484.

* cited by examiner

Primary Examiner — Thomas J Cleary
(74) Attorney, Agent, or Firm — Trop, Pruner & Hu, P.C.

(57) ABSTRACT

In an embodiment, a processor includes a logic to store a write transaction including an interrupt and data received from a device coupled to the processor to a cache line of a cache memory based on an address in an address queue, and forward an address of the cache line and assert an emulated message signaling interrupt (MSI) signal to an interrupt controller of the processor. Other embodiments are described and claimed.

28 Claims, 10 Drawing Sheets

US 8,996,774 B2

PERFORMING EMULATED MESSAGE SIGNALED INTERRUPT HANDLING

TECHNICAL FIELD

Embodiments of the present invention relate generally to data processing systems. More particularly, embodiments of the invention relate to emulating message signaled interrupts.

BACKGROUND

Message signaled interrupts (MSI) are a feature that enables a device coupled to a processor to request service by writing a system-specified data value to a system-specified address using, for example, a memory write transaction. An MSI transaction enables a device to request an interrupt service by sending the MSI transaction as an inbound memory write to the processor. MSI transactions can simplify board design by removing out of band interrupt routing.

Message signaled interrupts allow a device to write a small amount of data to a special address in memory space. The chipset will deliver the corresponding interrupt to the processor. However, this data is used by the chipset to determine which interrupt to trigger on which processor, but it is not available for the device to communicate additional information to the interrupt handler.

One drawback of MSI transactions is the latency involved with servicing an interrupt. For example, when a device requests an interrupt service using MSI, the device generates a MSI transaction including a system-specified message and a system-specified address. Once a processor receives the MSI transaction, the processor has to communicate with the requesting device to retrieve data required to service the interrupt. However, the latency involved with communications with the device may be relatively long.

DETAILED DESCRIPTION

Figure 1:
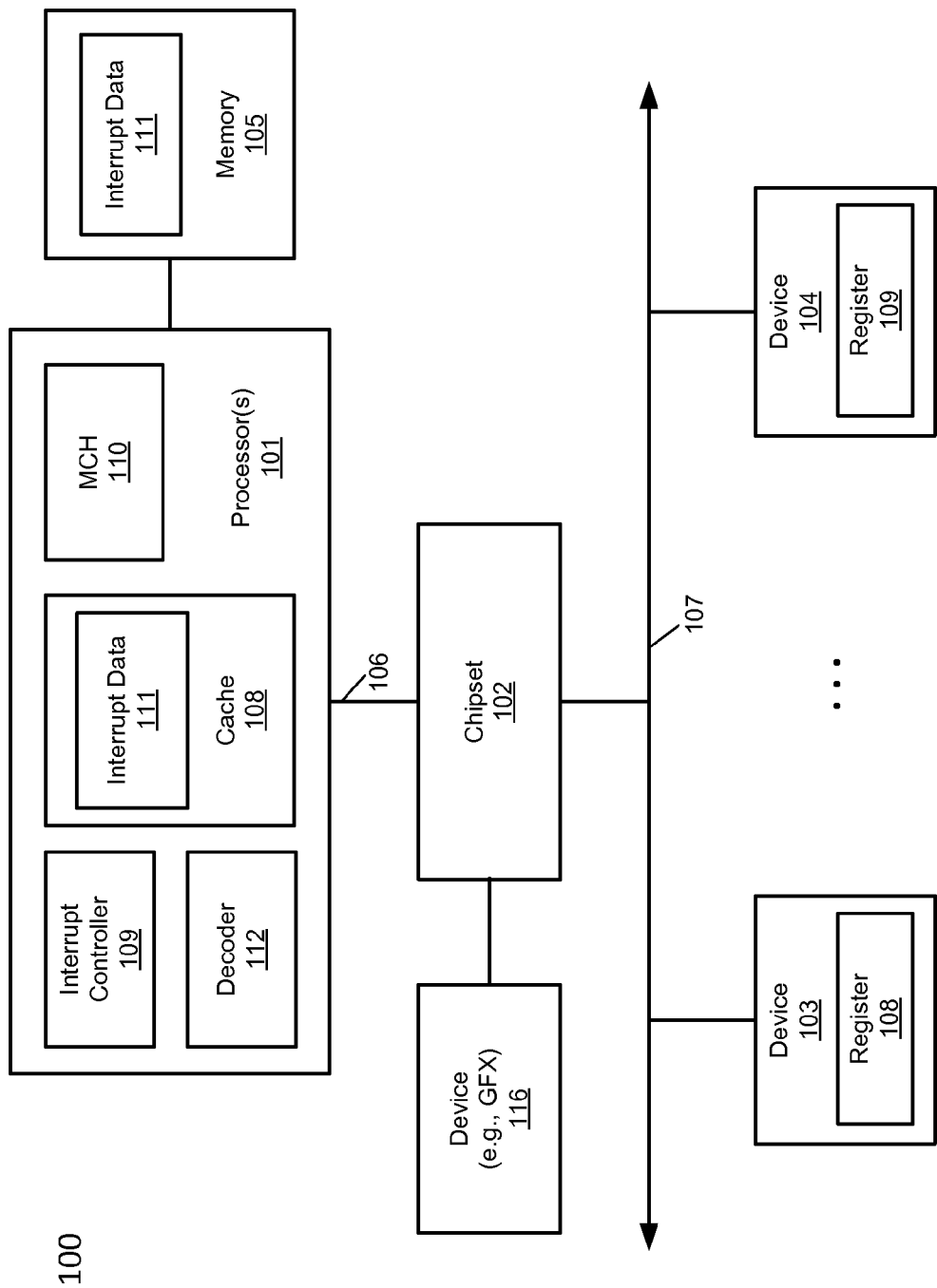
FIG. 1 is a block diagram of a system in accordance with one embodiment of the present invention.

In various embodiments, a device may request a message signaled interrupt (MSI) by sending interrupt data or messages, including an interrupt vector, to a processor directly to emulate an MSI interrupt, without having to send an actual MSI interrupt request to a system defined address for MSI. The interrupt data is not limited to the format or size required by a conventional MSI request. As a result, a device can send to the processor more data in a variety of formats than a regular MSI request would allow. Decoder logic associated with the processor or a chipset is configured to monitor and detect the emulated MSI request and to invoke an interrupt controller to issue an MSI interrupt based on the interrupt data.

According to one embodiment, for each device that is capable of handling MSI interrupts, a specific block of memory is allocated for the device. Such a block of memory may be allocated from a processor cache (e.g., processor level-2 (L2) or level-3 (L3) cache) or from a specific memory region of a system memory coupled to the processor. Each device is able to directly access its associated block of memory, for example, via a posted write transaction (e.g., using direct cache or memory access techniques). The size of a memory block associated with a device may vary dependent upon the specific configuration or needs, which may be configurable during an initialization of the system or device.

According to one embodiment, when a device is about to assert an MSI, instead of sending a regular MSI request message to a system defined address for MSI, the device is configured to send and store all the necessary data (also referred to herein as interrupt data) to be utilized during the interrupt service to the associated memory block via a posted write transaction. The interrupt data also includes an interrupt vector associated with an interrupt service routine (ISR) of the device. In response to the posted write transaction, decoder logic is configured to invoke an interrupt controller, such as an advanced programmable interrupt controller (APIC), to retrieve the interrupt vector from the memory block. In one embodiment, an MSI interrupt is directly sent to the processor and the interrupt vector of the MSI is intercepted by the processor APIC. The decoder logic may assert a signal (e.g. toggling an internal data signaling line) to the processor APIC to inform it of a pending emulated MSI interrupt.

When the processor invokes an ISR associated with the interrupt vector of a device, it can access the memory block specifically allocated to the device to retrieve the interrupt data and service the interrupt using the interrupt data without having to obtain the same data from the device via one or more IO transactions, which may take a relatively long period of time.

According to a further embodiment, the interrupt data to be stored in the memory block may include multiple interrupt vectors, each associated with an ISR or an entry point of an ISR. In response to detection of a posted write transaction to the memory block, decoder logic is configured to retrieve the interrupt vectors from the memory block. For each of the interrupt vectors, the decoder logic is configured to invoke the interrupt controller to access the interrupt vector from the memory block and invoke a processor or a processor core to execute an ISR associated with the interrupt vector. Such interrupt vectors may be associated with ISR routines that service multiple functions of a device or multiple devices. As a result, a single posted write transaction can request multiple MSI interrupts, including all the necessary interrupt data to be utilized during the associated interrupt services, without having to individually request multiple MSI interrupts to the system defined address for MSI.

FIG. 1 is a block diagram of a system to perform emulated MSI interrupt handling according to one embodiment. Referring to FIG. 1, system 100 includes a processor 101 coupled to chipset 102 via bus 106 (also referred to as a front side bus or FSB), where chipset 102 is coupled to one or more devices 103-104 via an input/output (IO) bus or interconnect 107. As seen, chipset 102 may also be coupled to another device 116, which in an embodiment can be a graphics processor. Processor 101 may represent single or multiple processors with single or multiple processor cores. Processor 101 further includes a memory controller hub (MCH) 110 to enable processor 101 or other devices such as devices 103-104 to access memory 105 over a memory bus or interconnect. In one embodiment, processor 101 includes a cache 108 (which may be implemented as one or more levels of a cache hierarchy) having certain cache lines specifically allocated to devices 103-104 to store interrupt data 111. When interrupt controller 109 (also referred to as an interrupt handler or APIC) is to invoke an execution unit (not shown) of processor 101 to handle an interrupt such an MSI interrupt requested from a device, the execution unit can directly access the corresponding block (e.g., cache line) of cache 108 associated with the device to retrieve interrupt data 111 of the device for the purpose of servicing the MSI interrupt, without having to obtain the same data from the device via one or more IO transactions (e.g., via chipset 102 and buses 106-107).

According to one embodiment, when a device such as device 103 or device 104 is about to assert an MSI, the device is configured to store interrupt data 111 to be utilized during the interrupt service to the associated block of cache 108 via a posted write transaction. Interrupt data 111 further includes an interrupt vector representing an entry point of an ISR associated with the device. Decoder logic 112 is configured to monitor and detect any posted write transaction to the allocated cache lines for the purpose of detecting emulated MSI interrupts initiated from devices 103-104. In some embodiments, decoder logic 112 may also reside in chipset 102 and coupled to MCH 110 for detecting writes to memory 105.

In response to detection of such posted write transaction, decoder logic 112 retrieves or causes interrupt controller 109 to retrieve an interrupt vector from the allocated cache lines. Interrupt controller 109 then invokes processor 101 to service the interrupt associated with the interrupt vector. When processor 101 invokes an ISR associated with the device based on the interrupt vector, processor 101 can access interrupt data 111 from the allocated cache line(s) associated with the device and service the interrupt using the interrupt data, without having to obtain the same interrupt data from the device via one or more IO transactions.

Note that a data block such as a cache line pre-allocated to a device for storing MSI information may be locked down, e.g., the cache line is allocated by marking it unavailable for automatic replacement and can be allocated to a device (e.g. device 103) by writing its cache line or memory address into device 103's interrupt data register 108, such that device 103 is the only device that can write to that cache line, in an embodiment.

Note that these memory blocks can be allocated during an initialization of system 100 (e.g., boot) or during initialization of device drivers. Alternatively, a memory block may be dynamically allocated when a device is connected with the system (e.g., detected by a plug-and-play manager).

For example, according to one embodiment, during initial enumeration of devices, the system firmware such as a basic input output system (BIOS), a boot loader or a low level OS initialization component can allocate and assign a block of memory to each device. For example, the system may directly configure or write a particular cache line address and/or size, or memory address and/or size associated with the corresponding memory block of each device in a predetermined register of the device (e.g., registers 108-109).

Device 103-104 can retrieve the cache line address or memory address from its interrupt data register and directly access the associated memory block to store the interrupt data, for example, via a direct cache access (DCA) or direct memory access (DMA) method when it wants to send an MSI interrupt to processor 101. Similarly, during system initialization, an OS may also write the same memory address and/or size of the allocated memory block previously allocated to device 102-103 to a device driver interrupt data parameter for the purpose of accessing device interrupt data from the same memory block during ISR interrupt service processing.

Embodiments may provide a method for a processor to assign priorities to manage and pipeline emulated MSI interrupts with data and multiple interrupt vectors to allocate processing tasks across multiple processors for effective and accelerated interrupt handling. Event queues may be provided for emulated MSI interrupts with interrupt data and multiple interrupt vectors.

In an embodiment, the processor defines a unique address range (also referred to herein as emulated MSI interrupt address range) (e.g., from 0x10000 to 0x11000) for intercepting emulated MSI interrupts with data and multiple interrupt vectors. This address range is similar to an address that an interrupting device would write to (e.g., 0x11200) if it were to assert a conventional MSI interrupt to the processor. An emulated MSI interrupt address range is equivalent to the size of one (or more) cache line entry, in one embodiment.

In turn, the processor pre-allocates and locks down multiple cache line entries (e.g., N cache line entries) of a shared cache and pushes the cache line addresses into a cache line address queue in decode logic coupled to the shared cache. In this way, better cache allocation may occur, as any of the locked down cache can be associated with any device asserting an interrupt rather than a single device.

Thereafter, a device that is to send an emulated MSI interrupt with data to the processor will package its interrupt data (e.g., interrupt vectors, CSR values and other interrupt data) as a posted write transaction and send the posted write transaction to the emulated MSI interrupt address range. The decode logic detects the write transaction to emulated MSI interrupt address range and does the following: 1) writes the posted write interrupt vectors and interrupt data to a locked down cache line entry pointed to by a cache line address on the top of its cache line address queue; 2) forwards the cache line address and asserts an emulated MSI interrupt signal to the processor APIC; 3) marks the cache line address as used; and 4) pops it from the cache line address queue and stores it in a temporary buffer.

In turn, the processor APIC inspects the cache line entry pointed to by the cache line address it receives from the decode logic and obtains the interrupt vector(s) and assigns each interrupt vector to a different processor cores for parallel processing of interrupts. In some embodiments, the processor APIC may temporarily store cache line addresses in a temporary queue and process them in the order of when they were received from the decode logic.

Each processor core may also utilize the interrupt data stored inside the cache line entry to assist in servicing its respective interrupt vectors. After the processor is done servicing the interrupt (such that all interrupt vectors have been processed), the processor APIC or decode logic marks the cache line address that corresponds to the cache line entry used for storing its interrupt data as unused and pushes the cache line address back to the cache line address queue to be re-used for servicing future interrupts. In the event that multiple devices simultaneously assert emulated MSI interrupts to the processor, each emulated MSI interrupt sent to processor may be stored inside a different locked down cache entry based on available "unused" cache line addresses in the cache line address queue.

In some embodiments, multiple emulated MSI interrupt address ranges may be defined by the decode logic to enable emulated MSI interrupt priority differentiation. Devices that want to assert a higher priority emulated MSI interrupt may write to a different emulated MSI interrupt address range such that the processor APIC may queue the corresponding high priority interrupt cache line address in a higher priority queue for future processing using the operations of the above described methods.

Figure 2:
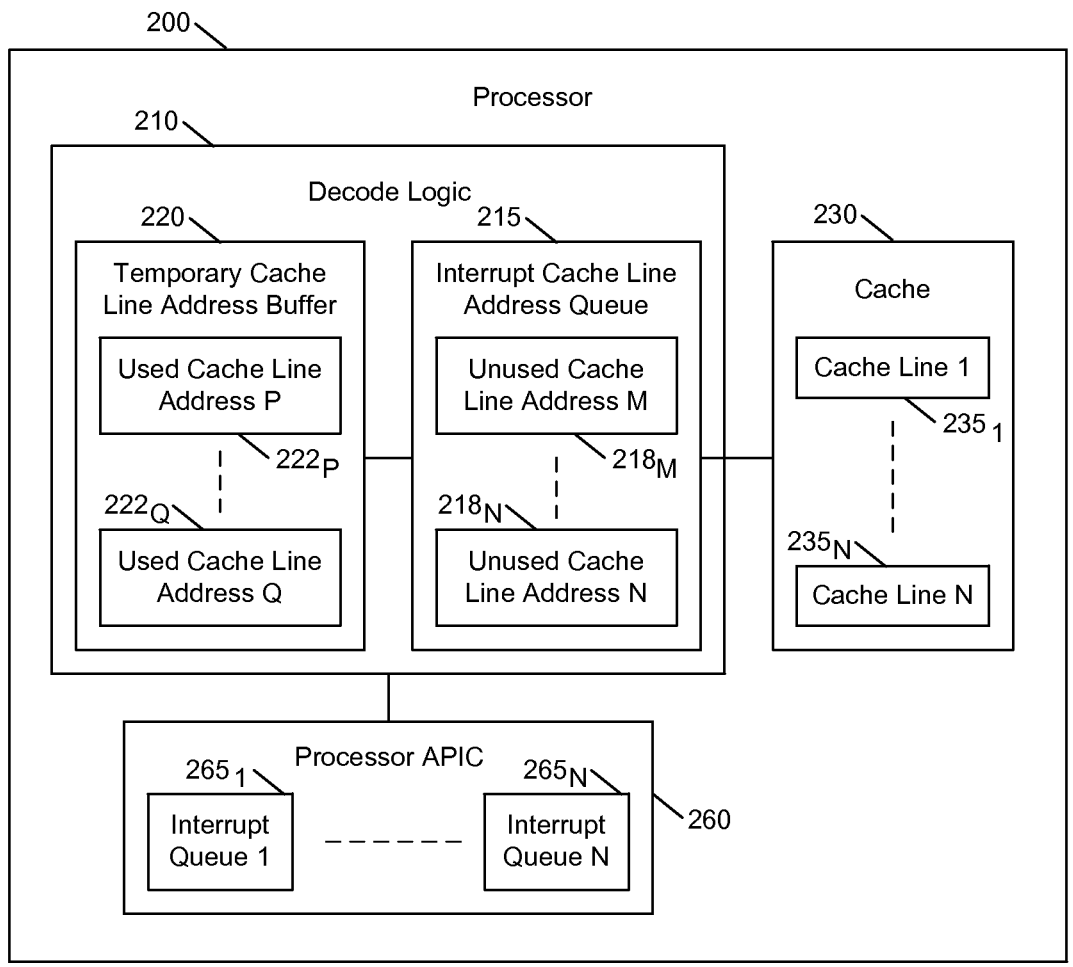
FIG. 2 is a block diagram of a processor in accordance with an embodiment of the present invention.

Referring now to FIG. 2, shown is a block diagram of a processor in accordance with an embodiment of the present invention. As shown in FIG. 2, processor 200 can include various components to receive and process instructions, such as one or more cores that may be of a given micro-architecture such as a pipelined architecture, e.g., in order or out-of-order cores. In addition, various system agent circuitry such as a power control unit, interfaces to other devices, cache memories and other logic may be present. However, for ease of illustration, the embodiment of FIG. 2 shows certain elements for use in performing emulated MSI operations in accordance with an embodiment of the present invention.

Specifically, processor 200 includes a decode logic 210 which can be used to handle emulated MSI processing, e.g., via detection of incoming write transactions from external devices that are directed to pre-allocated cache lines, namely locked-down cache lines in accordance with an embodiment of the present invention. In the embodiment shown in FIG. 2, these cache lines may be present in a cache memory 230 which can be a shared cache memory such as a last level cache (LLC) of the processor, e.g., a level 3 (L3) cache. In the example shown in FIG. 2, cache 230 may include a plurality of cache lines $235_1$-$235_n$, each of which can be pre-allocated to one or more devices that can send, via a posted write transaction, an emulated MSI interrupt along with interrupt data. Of course other cache lines may be present in cache 230.

Still referring to FIG. 2, decode logic 210 may include various hardware, software, and/or firmware to handle decoding operations such that these incoming write transactions are identified as being of an emulated MSI type and to handle the transactions accordingly, as described above. In addition as shown in FIG. 2, decode logic 210 may include an interrupt cache line address queue 215 and a temporary cache line address buffer 220. As seen, address queue 215 may include a plurality of entries $218_m$-$218_n$, each of which can be used to store an address of an unused cache line within the pre-allocated portion of cache memory 230. And in turn, address buffer 220 may include a plurality of entries $222_p$-$222_q$, each of which can store a used cache line address corresponding to one of the pre-allocated cache lines of cache memory 230 that is currently in use.

Still referring to FIG. 2, processor 200 may include a processor APIC 260, also referred to herein as an interrupt controller, that can identify various interrupts, including emulated MSI interrupts as described herein and to control allocation of these interrupts to one or more processor cores within processor 200. In addition, as described herein in some embodiments, in part using APIC 260, at least some of these interrupts can be sent via an inter-processor interrupt mechanism to another processor for handling. As seen in FIG. 2, APIC 260 may include a plurality of interrupt queues $265_1$-$265_n$. Each such queue may include information regarding a pending interrupt. Although shown at this high level in the embodiment in FIG. 2, understand the scope of the present invention is not limited in this regard.

Embodiments may also provide a method for a processor within a multi-processor system to distribute MSI interrupt processing tasks across a plurality of processors for effective and accelerated interrupt handling. In addition, a first processor can emulate sending of inter-processor interrupts with multiple interrupt vectors and interrupt data to a second processor of the system.

Multiple devices of a multi-processor system may simultaneously interrupt a single main processor of the multi-processor system to request services, when some or all processing cores of the processor are occupied with high priority tasks. In some instances there may be more interrupt requests and interrupt vectors to process than what the main processor can effectively handle without performance degradation. In some cases when a processor cache line address queue is almost empty (based on a preset threshold), it may also request other processors in the system to offload some of the pending interrupts inside its cache line address queue using the described inter-processor interrupt mechanism, thus freeing up additional cache line addresses to intercept future interrupts. As such the main processor may distribute the load of processing some of its interrupt requests and interrupt vectors to other processors on the system using an inter-processor interrupt mechanism.

In various embodiments, when multiple devices interrupt a processor their MSI interrupt vectors and interrupt data can be written to different locked down cache line locations. For each locked down cache line location that is written with data, decode logic may push the cache line address into the processor APIC's interrupt queue in the order that the emulated interrupts are received.

In turn, the processor APIC may perform the following operations: 1) inspect its interrupt queue and obtain from the top of the queue a cache line address to fetch a first set of interrupt vectors; 2) determine the number of available processing cores and the number of interrupt vectors to be processed, and if the number of cores is sufficient to process all interrupt vectors, assign to each processing core an interrupt vector to process in parallel (note that a core may obtain additional interrupt data from the locked down shared cache entry to assist in servicing its assigned interrupt).

If the number of available processing cores is less than the number of interrupt vectors to be processed, a subset of interrupt vectors can be assigned to the available cores for processing in parallel, e.g., by replicating the cache line entry that contains all the interrupt vectors, and then removing the interrupt vectors that have already been assigned to a processing core and sending this modified interrupt data cache line entry as a posted write transaction to another locked down cache line of a second processor in the system to trigger an emulated MSI interrupt on the second processor (note this operation may also be performed by a core). In turn, the second processor can process the emulated MSI interrupt based on the operations described above until all interrupt vectors have been assigned to their respective processing cores. In turn, the above operations can be repeated until there are no more cache line addresses in the processor APIC's interrupt queue (in other words, all interrupts have been processed). Note that the main or first processor may proceed to service consecutive interrupts from its processor APIC interrupt queue or forward the interrupt data cache line entry to another processor until there are no more pending interrupts left in the processor APIC's interrupt queue.

Thus according to various embodiments, interrupts from multiple multi-function devices can be serviced in parallel utilizing all available processing cores in a multi-processor system to increase the overall performance of the multi-processor system. Embodiments may further be used to emulate sending of inter-processor MSI interrupts with interrupt vectors and interrupt data to distribute interrupt servicing loads across all processing cores to accelerating interrupt processing.

Embodiments may enable better load distribution and load balancing among servers in a cloud computing environment; which will better utilize server bandwidth and increase a cloud server overall system's performance. Embodiments enable a processor to pipeline multiple emulated MSI interrupts with data and multiple interrupt vectors from multiple devices and process them in parallel based on available processor cores, which is an effective method of processing MSI interrupts. Embodiments thus provide an event queue mechanism for managing and pipelining multiple emulated MSI interrupts and/or for assigning priority to each set of interrupts.

The processor APIC may maintain multiple interrupt queues for storing cache line addresses of emulated MSI interrupts, and can assign interrupt processing tasks from these queues to different processor cores based on available processor resources. In addition, pipelining and assigning priority to interrupts enables better interrupt processing load distribution among processor cores may increase the overall efficiency of a processor.

Figure 3:
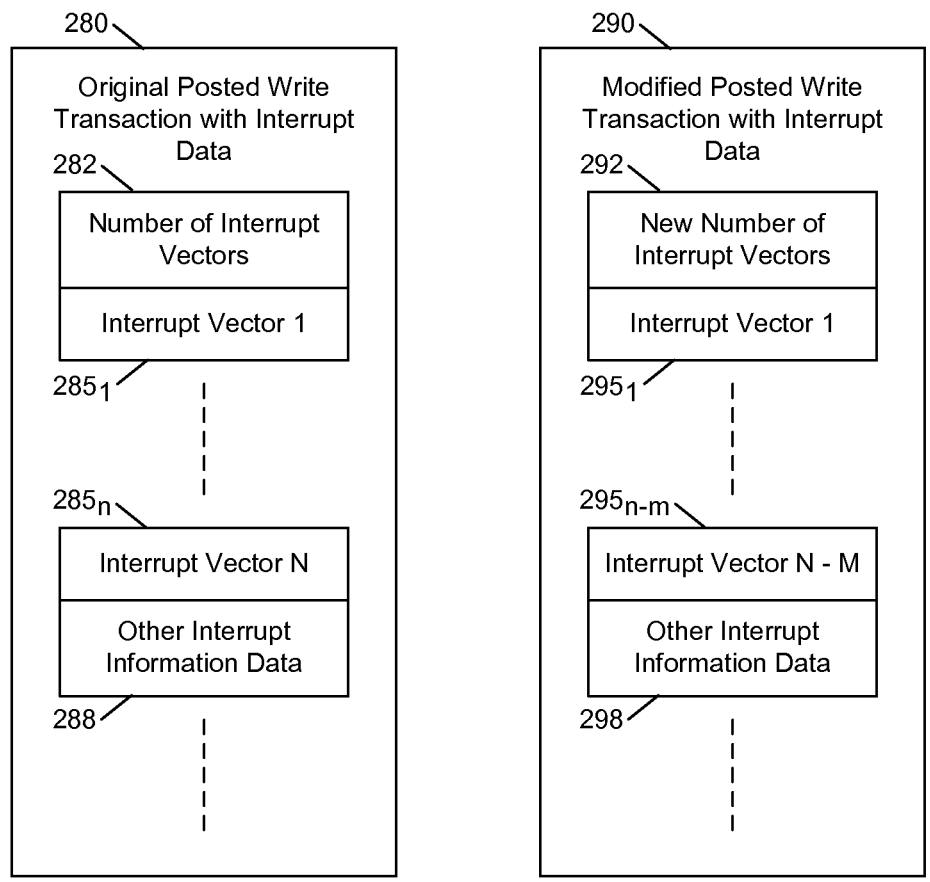
FIG. 3 is an example embodiment of updated or modified interrupt vectors and data in accordance with an embodiment of the present invention.

Referring now to FIG. 3, shown is an example embodiment of updated or modified interrupt vectors and data in accordance with an embodiment of the present invention. Specifically, FIG. 3 shows an original posted write transaction 280 that may be received from a device coupled to the processor. As seen, this posted write transaction includes various information including a field 282 to identify a number of interrupt vectors present in the write transaction, a plurality of interrupt vectors $285_1$-$285_n$, and an additional data field 288 that may include other interrupt information data.

As described herein, to reduce load on the processor and to provide for more efficient handling of such incoming interrupts, the processor can extract certain information from this posted write transaction for handling interrupts associated with this write transaction, and to modify the write transaction to thereafter pass the modified posted write transaction to another processor, e.g., via an inter-processor interrupt to enable that processor to handle at least some of the remaining interrupt processing identified in this modified write transaction.

Thus as shown in FIG. 3, the processor may generate a modified posted write transaction 290. As seen, this posted write transaction can include various information, including a field 292 to identify a new (and typically smaller) number of interrupt vectors, these interrupt vector $295_1$-$295_{n-m}$, and an additional field 298 to identify other interrupt information. Although shown at this high level in the embodiment of FIG. 3, understand the scope of the present invention is not limited in this regard.

In addition to devices that assert an MSI interrupt to a processor by selective pre-sending of device-specific information to the processor using a direct cache access mechanism, as described herein other bus agents coupled to the processor bus or system bus may also have the capability to write to the cache memory using a direct cache access method. A bus agent such as an independent processing unit or a device may accidentally or under the influence of malicious code attempt to overwrite interrupt data of another device in a processor cache line, or trigger an emulated MSI interrupt with malicious interrupt data. This may cause the unsuspecting device's ISR to access invalid interrupt data and compromise the system.

Embodiments may provide a method to protect the integrity of interrupt data for each device on a processor bus or system bus to ensure that all interrupt data in the cache lines are always correct and most updated when servicing an emulated MSI interrupt with data.

To this end, when a device requests an interrupts, the device hardware ID and its assigned locked down cache line address are logged inside an address/ID lookup table accessible by the processor APIC.

A device (e.g., device A) asserts an emulated MSI interrupt with interrupt data to the processor by writing its interrupt data and interrupt vectors to its assigned locked down shared cache line. When device A's interrupt data appears on the processor or system bus, the device's hardware ID is posted in a hardware ID field of the transaction data packet header, and is sent to its pre-allocated processor cache line address to trigger the emulated MSI interrupt with interrupt data. In various embodiments, the device hardware ID may be posted in an existing reserved or non-used field of the packet header or another such field.

Decoder logic coupled to the cache detects the posted write transaction to a locked down cache line and keeps track of both the cache line address and the device hardware ID of the posted write transaction. In turn, the decoder logic forwards the cache line address to the processor APIC and asserts an emulated MSI interrupt signal to the processor APIC. The processor APIC checks its address/ID lookup table to determine whether the device hardware ID of the posted bus transaction matches the device hardware ID stored in its lookup table, and if so the processor APIC obtains the one or more interrupt vectors from the locked down processor cache line using the cache line address forwarded from the decoder logic. The processor APIC invokes one or more processor cores to execute the interrupt service routine(s) associated with the one or more interrupt vectors, using interrupt data stored inside the locked down cache line.

For the case of using an event queue, an address range (e.g., 0x10000 to 0x11000) may be allocated. However each device may still be assigned a unique address to send a posted write transaction to if the device wants to trigger an emulated MSI interrupt. For example, device A (with hardware ID 0xA) may be assigned address 0x11000, while device B (with hardware ID 0xB) may be assigned address 0x12000. Both devices may send MSI interrupts to the processor using their respective assigned addresses.

Posted write transactions from both devices may be stored inside an unused cache line obtained from the cache line address queue, based on the above described embodiment. The processor APIC keeps track of each device's hardware ID; assigned emulated MSI interrupt address and a list of valid interrupt vectors (e.g., device ID 0xA→ address 0x11100→[valid interrupt vector list for device A (e.g., 0x1234)]; device ID 0xB→ address 0x11200 [valid interrupt vector list for device B]). For example, device B may send an emulated MSI interrupt to the processor using address 0x11200 with an interrupt vector associated with device A (0x1234) and malicious interrupt data. The processor APIC may observe that the interrupt vector (0x1234) does not belong to device B and ignores the interrupt vector, thus preventing other devices (e.g., device B) from triggering an interrupt associated with device A.

In an embodiment, the processor APIC or decoder logic discards all future posted write data from being stored to the same locked down cache line while the interrupts associated with this cache line are being processed. After interrupt processing is done, the locked down cache line may again enabled to intercept the next emulated MSI interrupt data from its associated device (e.g. device A). This ensures that no other device is able to modify MSI interrupt data stored inside a processor cache line when an interrupt associated with the cache line is being processed.

If instead the hardware ID does not match, the processor APIC discards the interrupt vector, ignores or invalidates interrupt data stored inside the locked down cache line, and may raise an alarm. In some embodiments, when there is a mismatched ID, the entire posted write transaction may be dropped without having to first store the data inside a cache line.

Embodiments thus provide a device hardware ID that appears on a processor bus or system bus unique for each device that resides on the bus. This device ID field on posted write transactions can be used by the processor APIC to verify the source of a posted write transaction including an emulated MSI interrupt with data posted write transaction. If a rogue device writes data to a locked down cache line entry assigned to a different device using direct cache access, this posted write transaction can be easily detected and dealt with as described above. Embodiments thus ensure that a device or processor on a system bus can only write to its assigned locked down cache line entry to trigger an emulated MSI interrupt and is not able to interfere with the cache line entries (e.g., interrupt data) of other devices. Embodiments also ensure that a device or processor on a system bus can only invoke its own interrupt handler and not another device's interrupt handler.

As such, posted writes from other devices to the same cache line address will be ignored, and a cache line access violation alarm may be triggered. In addition direct cache access writes to a reserved emulated MSI interrupt cache line address during interrupt processing will not cause the cache line data to change. And, direct cache access writes to a reserved emulated MSI interrupt cache line address that do not belong to the device may cause an illegal cache line access alarm to be triggered.

Figure 4:
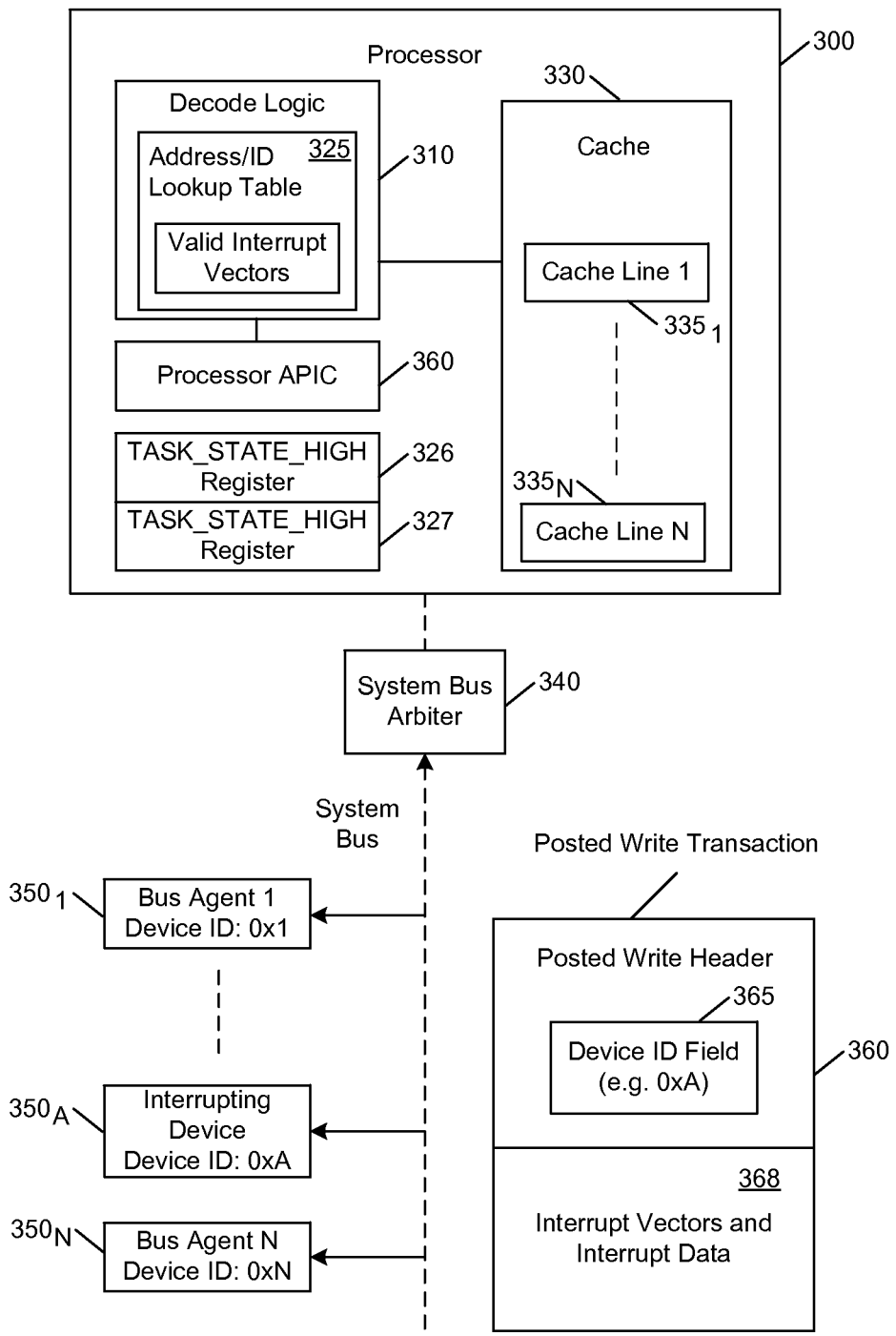
FIG. 4 is a block diagram of a portion of a system in accordance with an embodiment of the present invention.

Referring now to FIG. 4, shown is a block diagram of a portion of the system in accordance with an embodiment of the present invention. As shown in FIG. 4, system 301 includes a processor 300 that is coupled via a system bus arbiter 340 to a plurality of devices $350_1$-$350_n$, each of which may correspond to a given bus agent such as a peripheral device, which can be any of different types of devices such as a host bus controller device (e.g., a PCI Express (PCIe™) host controller, a USB host controller and a SATA host controller), a graphics or display device, a network device (e.g., an Ethernet host controller), a power management device, a storage device, a security device (e.g., a cryptographic or security engine), a wireless device; or any device that can be coupled to a processor via a standard bus architecture such as a PCIe™ or a USB bus. Such devices may include keyboards, mouse, pointer devices, touch screen devices, printers, cameras, display panels, disk drives, network interface cards and graphics cards. As seen each bus agent 350 may have a device identifier (device ID). These device identifiers can be pre-allocated and may be stored in a corresponding device ID register or other storage of each such device. In some embodiments, a device ID may be physically embedded inside a hardware device, making the ID non-changeable by software.

With reference to FIG. 4, note that in this example bus agent $350_A$ may be an interrupting device that generates an MSI interrupt that is communicated to processor 300 via arbiter 340. As seen, this MSI interrupt may be sent as a posted write transaction 360 that includes various information. For purposes of discussion herein, this write transaction may include a device identifier field within a header 365 which thus provides the device ID for the interrupting device, and which can be used within processor 300 to perform security and other operations as described herein. As further seen, posted write transaction 360 may include a data portion 368 including interrupt vectors and interrupt data.

When this transaction is received and arbitrated in arbiter 340 it may be provided to processor 300, where decode logic 310 may parse the information to determine an appropriate location for storage within cache memory 330 which, as shown includes a plurality of cache lines $335_1$-$335_N$.

In various embodiments, decode logic 310 may include an address/ID lookup table 325 that includes a plurality of entries each of which identifies a valid device address/ID and associates the ID with a list of valid interrupt vectors for each device. Using this information, decode logic 310 can identify whether a posted write transaction is received from a valid device and allocate it to the appropriate cache line. Decode logic 310 can also determine whether an interrupt vector is received from a valid device and invoke an interrupt handler associated with the interrupt vector. As further seen, processor 300 includes an APIC 360 which when triggered via decode logic 310 or via other logic of the processor can process a given emulated MSI interrupt to thus allocate the interrupt to be handled in a given core, potentially using interrupt data provided within the posted write transaction itself.

Before a processor APIC invokes a processor or processor core to branch to an interrupt service routine, the processor saves its state and context information into kernel memory to enable it to restore the execution context of its previous task after it is done execution of the interrupt service routine. Processor state and context information may be stored inside a task state segment (TSS) of kernel memory with hardware support, or may be selectively stored in a stack structure in kernel memory by the operating system (e.g., Windows™ and Linux™). Processor state and context information may include: processor general purpose register values; floating point register values; processor state register values; stack and function pointer addresses; program counters; IO permission bitmap offset addresses; and other information needed to restore the processor state and execution context of a previous task after processor is done executing an interrupt handler.

Embodiments may be used to expedite storing and retrieving of processor state and context information during an emulated MSI interrupt with interrupt data event. In various embodiments, additional space is reserved in a device's pre-allocated locked down cache line for the processor to store its state and context information. In some embodiments, software driver or hardware support may be provided for storing processor state and context information into reserved cache line space.

This additional storage space can be reserved in the locked down cache line to store processor state information during an emulated MSI interrupt with interrupt data. Reserved cache line storage space starting and ending addresses may be specified by two offset parameters (TASK_STATE_HIGH & TASK_STATE_LOW) from a cache line address received from the decode logic.

Operating system or dedicated logic inside a processor may be configured to selectively store processor state and context information inside the cache line location pointed to by the cache line address plus an offset between TASK_STATE_HIGH and TASK_STATE_LOW, before branching to its interrupt handler. After the processor is done executing the interrupt handler, it can restore the processor state and execution context information of a previous task by reading them from its cache line storage space. Both TASK_STATE_HIGH and TASK_STATE_LOW offset parameters may be stored as device driver parameters, or preconfigured in a set of processor interrupt parameter registers in various embodiments.

In some embodiments, two or more cache lines may be pre-allocated to a device to accommodate storing of more processor state and context information. It can be appreciated that processor state and context information stored during an emulated MSI interrupt with interrupt data event may be customizable by an operating system.

As such, embodiments enable processor state information associated with a device to be selectively stored in a cache line instead of system memory during interrupt processing for faster context switching. Since each device's assigned cache line has been pre-allocated and locked down, the processor state and context information will be preserved throughout the interrupt processing timeframe.

In this way, embodiments can avoid storing this information in a task state segment (TSS) or selectively storing the information in kernel memory by an operating system or device driver. Note that the cache line address offset parameter may be customized by the operating system based on how much storage space is needed to store all or a subset of necessary processor state and context information during an interrupt event.

Referring back to FIG. 4, processor 300 further includes a plurality of task state registers. In some embodiments, a pair of task state registers may be shared among multiple devices if all the devices use the same cache line segments for storing processor state and context information. In some embodiments there may be multiple pairs of such registers, each pair of which can be allocated to a given device of the system.

This pair of registers, namely a first task state register 326 and a second task state register 327, may be configured to store respectively, a beginning address and an end address of a portion of a cache line (e.g., a locked down cache line associated with a given device) to provide a temporary storage space for a core's state to be stored prior to execution of a given interrupt service routine. That is, this portion of the cache line can store a core's current context, which can include state information such as the state of various configuration and status registers, as well as a current state of its architectural registers.

Embodiments may also enable devices to send legacy interrupts to a processor bundled with device data or messages to accelerate interrupt processing. Some devices on a given bus may be configured to support sending of legacy interrupts to the processor. That is, a device may assert a legacy interrupt to the processor by sending an interrupt line assert (or de-assert) message to an IOxAPIC, e.g., on a backbone bus using a sideband messaging protocol. Interrupt line (e.g., INT-A, INT-B . . . INT-X) assertion and de-assertion may be managed through the IOxAPIC. Legacy interrupt service routines may then initiate multiple IO transactions to read registers from the device that had asserted the interrupt, to determine what is to be done. However, this may be a time consuming process.

In contrast, in various embodiments a user or system software pre-allocates and locks down a cache line entry for each device that seeks the capability to assert a legacy interrupt to a processor bundled with device data or messages. Such a pre-allocated cache line address can be written to a device's direct cache access register so that whenever a device wants to assert a legacy interrupt to processor, it packages its interrupt data into a posted write transaction and sends the transaction to the shared cache using the cache line address in its direct cache access register. Data written to the cache line will contain device specific information to assist processor in processing the interrupt which may include: interrupt vectors; selected configuration and status (CSR) register values; service request symbol or tag; filled DMA buffer addresses; device specific messages; and any other data that helps the device's interrupt service routine determine what is to be done.

A cache line address lookup table may be coupled to the processor APIC that contains mappings of interrupt lines to their corresponding user-configured cache line addresses. For each device that wants to assert a legacy interrupt to the processor, system software can: pre-allocate a locked down cache line entry for the device to write its interrupt data; assign an interrupt line to the device; and map the locked down cache line address to its corresponding interrupt line in the processor APIC's cache line address lookup table.

When the decode logic detects a direct cache access write operation to a user configured pre-allocated cache line address in the shared cache, it asserts an emulated legacy interrupt signal to the processor APIC and sends the cache line address to processor APIC. In response, the decode logic reports the emulated legacy interrupt signal to the processor APIC, which checks the received cache line address with its cache line address lookup table and identifies the interrupt line (e.g., INT-A) that is mapped to the received cache line address and pushes the cache line address into INT-A's interrupt queue. Upon detection of a legacy interrupt line assertion (e.g., INT-A is asserted), the processor APIC examines INT-A's interrupt queue. If the interrupt queue is not empty, for each cache line address in the interrupt queue, the processor APIC fetches the interrupt vector from the cache line entry pointed to by the cache line address and assigns the interrupt vector to a processor core for servicing.

The processor core may utilize other interrupt data in the cache line entry to service the interrupt without having to read device registers using multiple IO transactions. Note that the processor APIC may also execute the interrupt service routines of other chained conventional legacy interrupting devices to enable backward compatibility. Thereafter, the processor de-asserts the interrupt line after all interrupts tied to the line have been serviced.

Embodiments thus enable a device to proactively push its CSR register values and other interrupt data into a cache when asserting a legacy interrupt to the processor. A processor can have fast access to information to service an interrupt and does not have to selectively poll the registers of an interrupting device using multiple IO transactions, which can be inefficient and time consuming. As such, embodiments increase the overall performance of a processor for servicing legacy interrupts.

Figure 5:
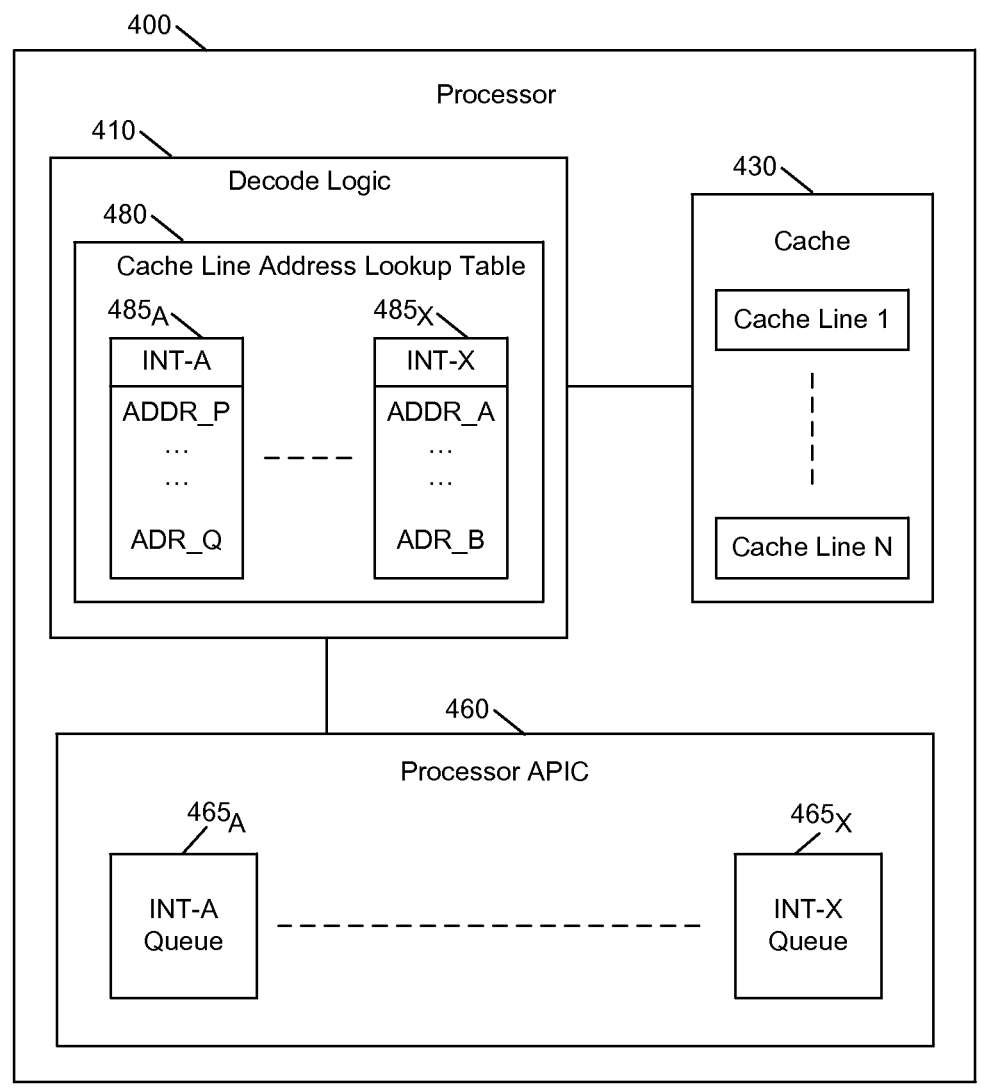
FIG. 5 is a block diagram of a processor in accordance with another embodiment of the present invention

Referring now to FIG. 5, shown is a block diagram of a processor in accordance with another embodiment of the present invention. As seen in FIG. 5, processor 400 can include a decode logic 410, along with a cache 430 and a processor APIC 460.

To provide legacy interrupt handling in accordance with an embodiment of the present invention, decode logic 410 may be associated with a cache line address lookup table 480. As seen, this lookup table may include a plurality of entries $485_A$-$455_X$. As seen, each entry 485 may be associated with a particular legacy interrupt line and can include a listing of one or more cache lines with which this legacy interrupt line can be associated. APIC 460 includes a plurality of buffers or queues $465_A$-$465_X$. Each such queue may store information associated with a given legacy interrupt line. Each such queue may store one or more cache line addresses associated with legacy interrupts implemented by way of the emulated legacy interrupt handling described herein. Although shown at this high level in the embodiments of FIG. 5, understand the scope of the present invention is not limited in this regard.

Figure 6:
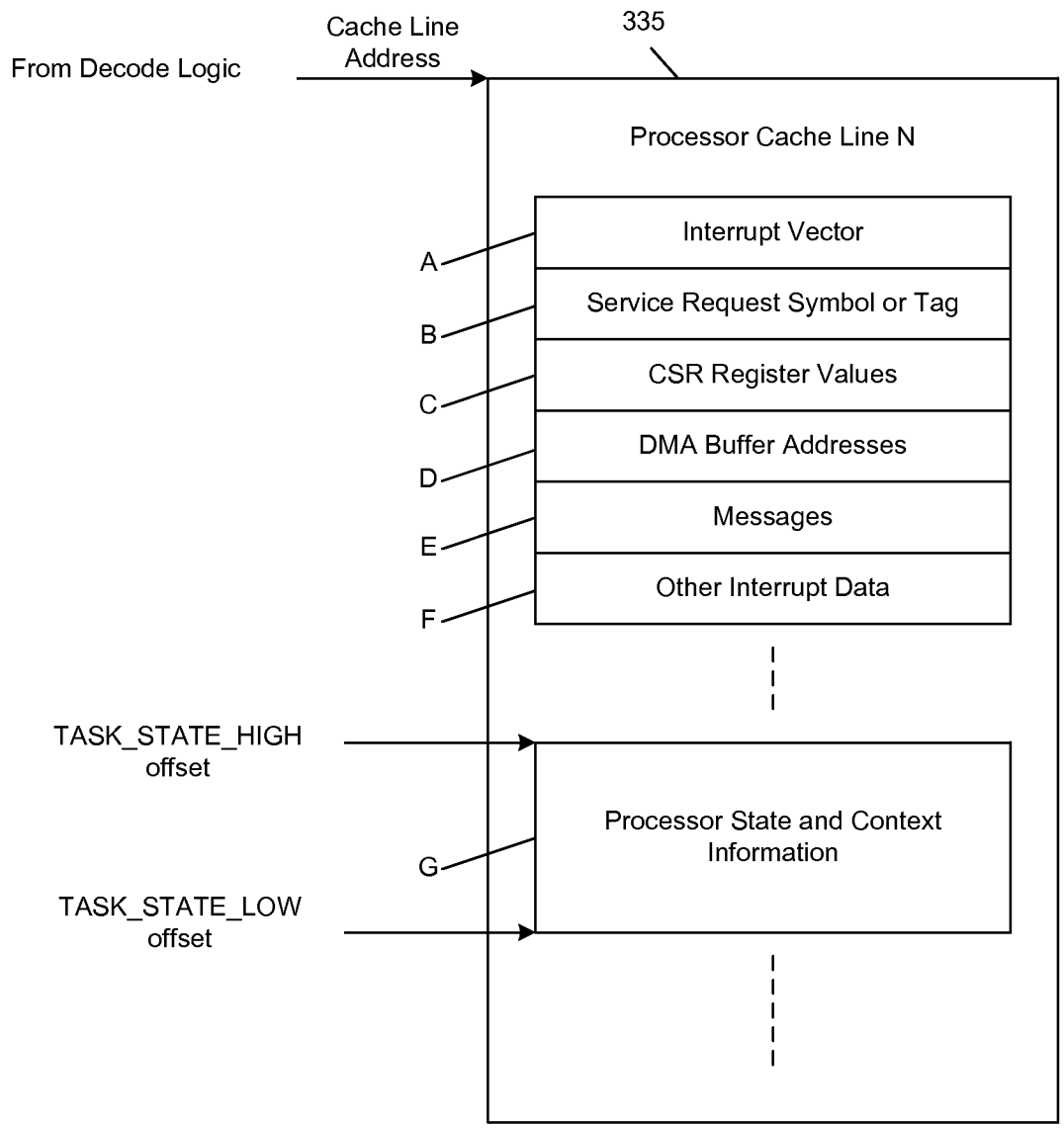
FIG. 6 is a block diagram of data stored in a memory block in accordance with one embodiment of the present invention.

Note that devices may selectively push only subsets of information to be used by the processor to service its interrupt. FIG. 6 shows an example embodiment of data that may be pushed into a cache line 335. The first data A is an interrupt vector. The second entry B may be a pre-defined symbol or tag to inform the interrupt service routine of what services are needed by the interrupting device (e.g., a filled direct memory access (DMA) buffer is to be processed; an error condition has occurred and needs attention; data is available; or a device is ready to receive additional data). The third or subsequent data entry C may contain CSR register information C, buffer addresses D, messages E, or even device generated data F if the data is small enough to fit into the cache line entry's available space. Also, a segment G may be reserved for storing processor state and context information. In another embodiment, multiple contiguous cache line entries may be allocated and locked down if a device needs additional space to store its interrupt information data.

It can be appreciated that device or device driver designers may choose to use a conventional method of servicing a legacy interrupt, an embodiment of the present invention, or a combination of the two, depending on whether it is more efficient for their device to proactively send data to the processor when it wants to interrupt the processor, instead of using multiple IO transactions to poll device registers. As such the device or device firmware may selectively choose which interrupt information to push into processor cache based on events that are causing the interrupt.

Using an embodiment, minimal or no IO transactions are needed to obtain interrupt data from device registers for legacy interrupts, as instead device CSR register values and other interrupt information can be proactively sent to processor cache when an interrupt occurs.

Embodiments may define an operating system function call to map sets of device driver software parameters to its actual device register values during an emulated MSI interrupt with data for fast interrupt processing.

Figure 7:
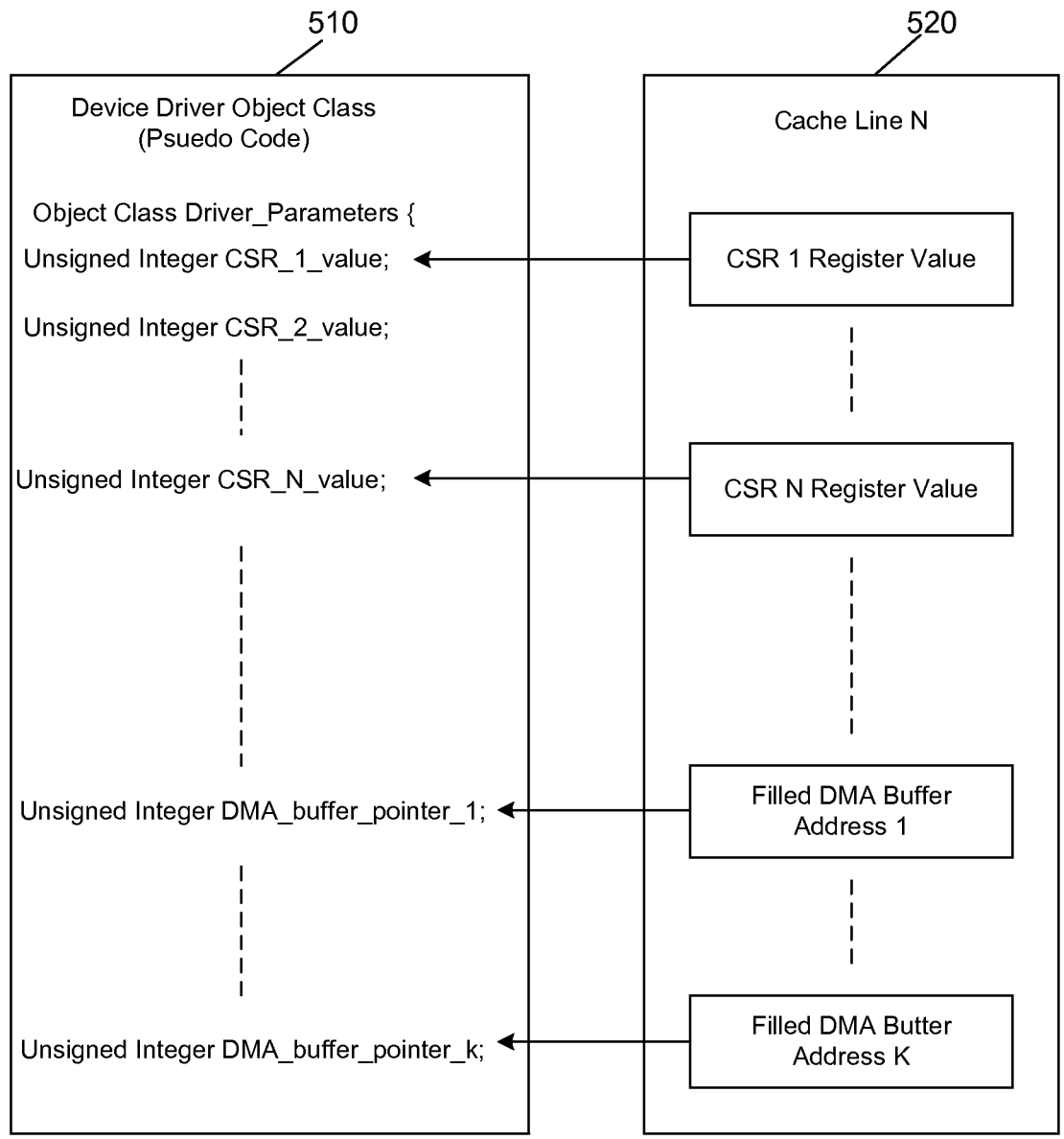
FIG. 7 is a block diagram of an example mapping of interrupt data to driver parameters in accordance with one embodiment of the present invention.

A set of device driver parameters may be encapsulated inside a class object or structure as shown in FIG. 7 which is an example mapping of interrupt data to driver parameters in accordance with one embodiment of the present invention. As seen in FIG. 7, a device driver object class 510 contains multiple device driver parameters to hold values of: multiple CSRs; filled DMA buffer addresses; device driver tags or messages; and any other device related information that can be used by device driver to assist in processing an interrupt. An OS application programming interface (API) or function call may be used for a user to pre-map or dynamically map a device driver's class object to its associated cache line interrupt data, shown in FIG. 7 as cache line 520. This may be accomplished by keeping track of the emulated MSI interrupt cache line address and using this cache line address plus an offset to the first interrupt data word of the cache line to produce a base pointer to the device driver class object. Hence, the driver class object's base-pointer points to the address of the first data word of cache line 520 that contains interrupt data.

The sequence ordering of data words pushed into the cache can match the sequence ordering of parameters defined in device driver's class object. FIG. 7 shows an example set of device interrupt data words pushed into the cache memory. It can be seen that each data word in the cache line entry corresponds to the ordered parameter list defined in the device driver's class object. The first interrupt data word (CSR_1 register value) is mapped into the first parameter of the object class (CSR_1_value); the last interrupt data word (filled DMA buffer address K) is mapped into the last parameter of the object class (DMA_buffer_pointer_k).

Figure 8:
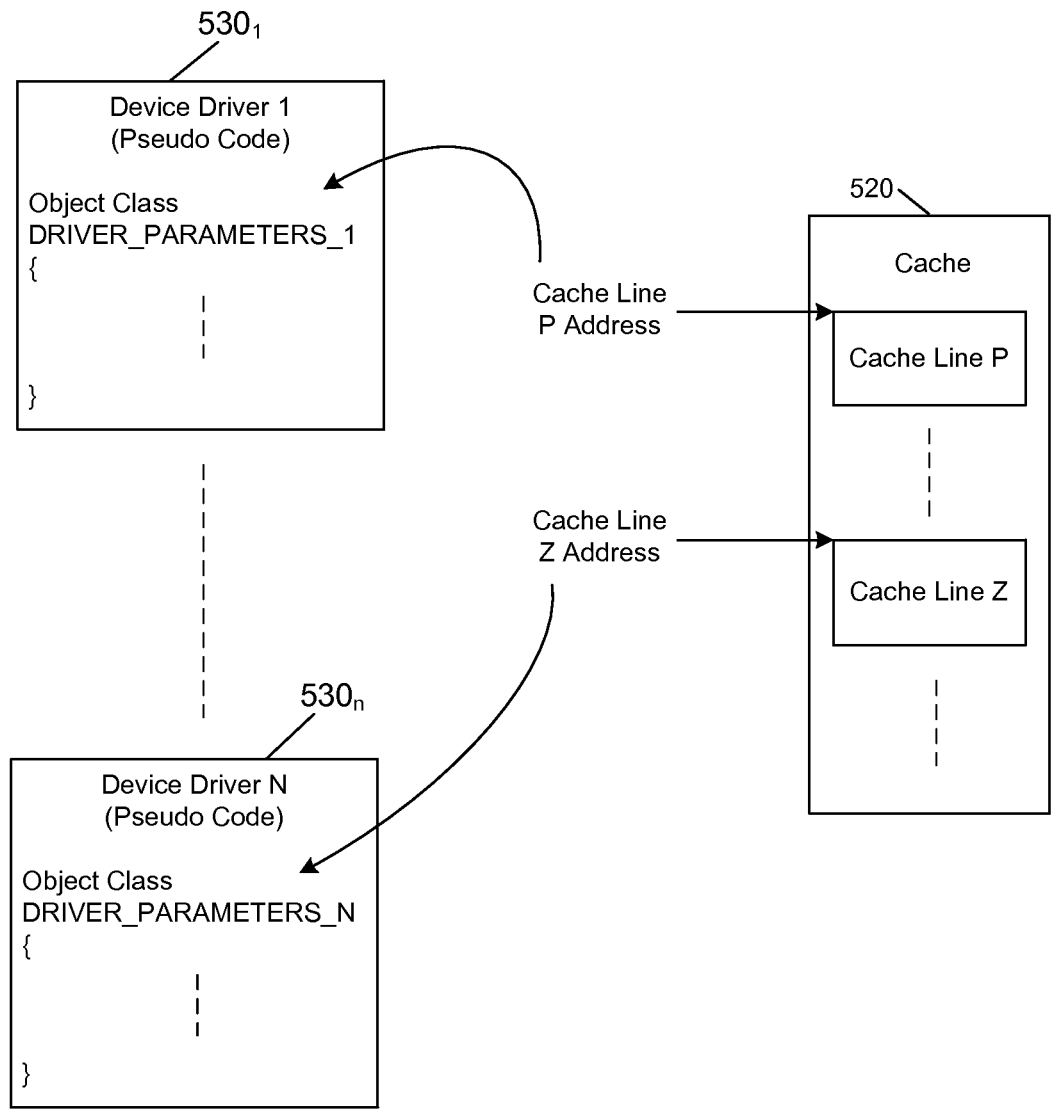
FIG. 8 is a block diagram of an example mapping of cache line addresses to object class base pointers in accordance with one embodiment of the present invention.

When a device interrupts the processor using an emulated MSI interrupt with data, it pushes a set of user-defined device register values and other interrupt data into the pre-allocated processor cache using a direct cache access mechanism. The device driver can easily access individual interrupt data entries from the cache by referencing them using the parameter names of the device driver object class, as illustrated in FIG. 8, which is an example mapping of cache line addresses to object class base pointers in accordance with one embodiment of the present invention. As seen, device drivers $530_1$-$530_n$ recognize an offset to a corresponding cache line and as such the parameter values can map directly to a cache line address.

Embodiments thus provide a method for device driver to easily access interrupt data stored in processor cache using an emulated MSI interrupt with data by referencing user understandable parameter names of a device driver object class or structure, without the need to initiate multiple IO transactions to poll multiple device registers to obtain the device driver parameter values.

Thus in various embodiments, a device driver's object class or structure can encapsulate driver parameters in the same sequence order and byte size as the actual interrupt data pushed into the cache memory. As such an OS API or function call can map the device driver's object class base pointer to the cache line address that points to the first interrupt data word so the interrupt data can be accessed using named parameters of the object class. Accordingly, driver parameters can be easily accessed using name parameters by calling a single operating system API or function call, without IO transactions to map a set of driver interrupt data to its associated named parameters that are encapsulated inside an object class or structure.

Figure 9:
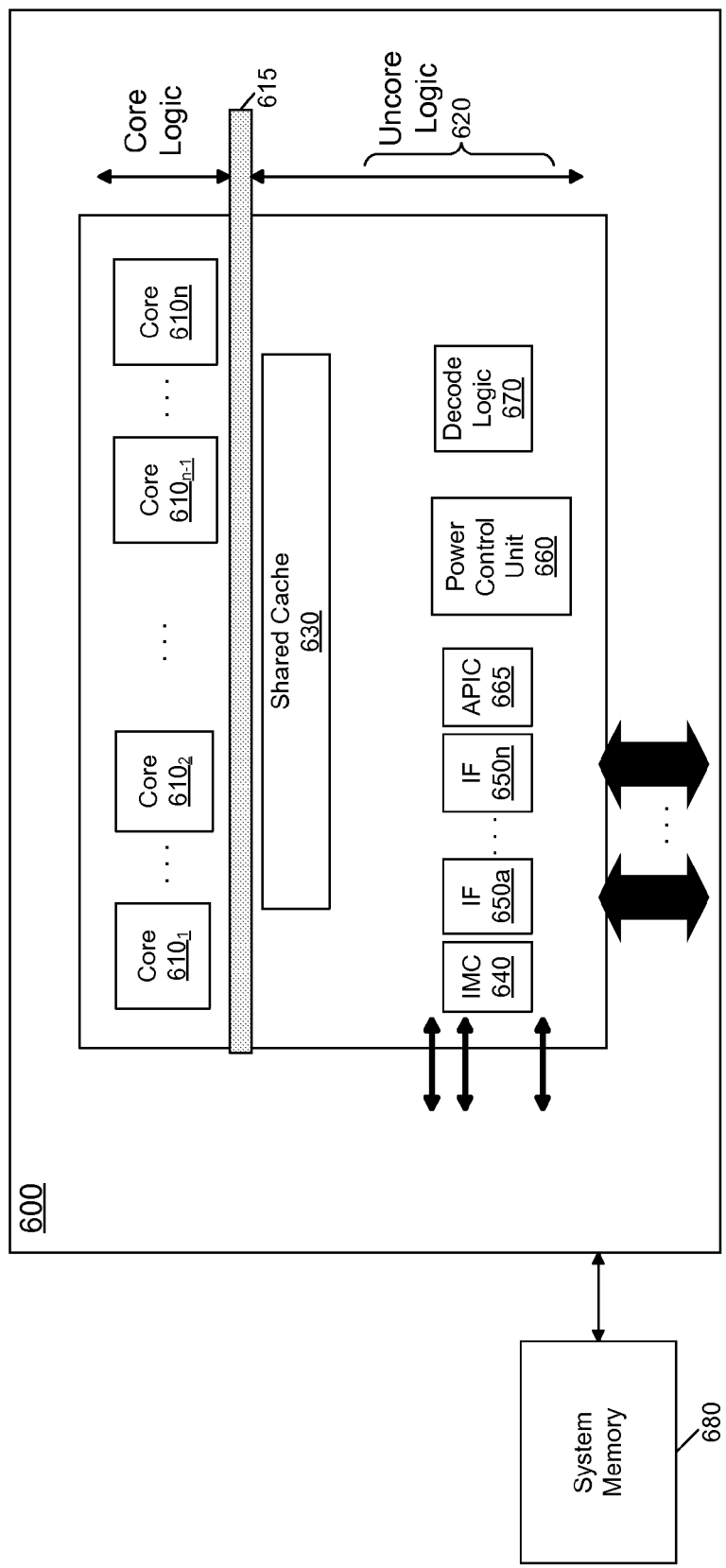
FIG. 9 is a block diagram of a processor in accordance with another embodiment of the present invention.

Referring now to FIG. 9, shown is a block diagram of a processor in accordance with another embodiment of the present invention. As shown in FIG. 9, processor 600 may be a multicore processor including a plurality of cores $610_1$-$610_n$, each of which may receive and handle interrupts such as emulated MSI interrupts as described herein. In some embodiments, these cores can be of heterogeneous size, performance, power, and other capabilities.

As seen, the various cores may be coupled via an interconnect 615 to a system agent or uncore 620 that includes various components. As seen, the uncore 620 may include a shared cache 630 which may be a last level cache and which can include a plurality of locked down cache lines used for receiving and storing interrupt data and interrupt vectors associated with emulated MSI interrupts. In addition, the uncore may include an integrated memory controller 640, various interfaces 650a-n, an APIC 665, a power control unit 660, and a decode logic 670. APIC 665 may, along with decode logic 670, handle incoming emulated MSI interrupts and control their execution on an appropriate core, or package data that cannot be timely handled in the processor into an inter-processor package of data that can be sent via an inter-processor interrupt for handling on another processor.

With further reference to FIG. 9, processor 600 may communicate with a system memory 680, e.g., via a memory bus. In addition, by interfaces 650, connection can be made to various off-chip components such as peripheral devices, mass storage and so forth. While shown with this particular implementation in the embodiment of FIG. 9, the scope of the present invention is not limited in this regard. For example, in some embodiments a processor such as shown in FIG. 9 can further include an integrated graphics engine, which may be of a separate graphics domain.

Figure 10:
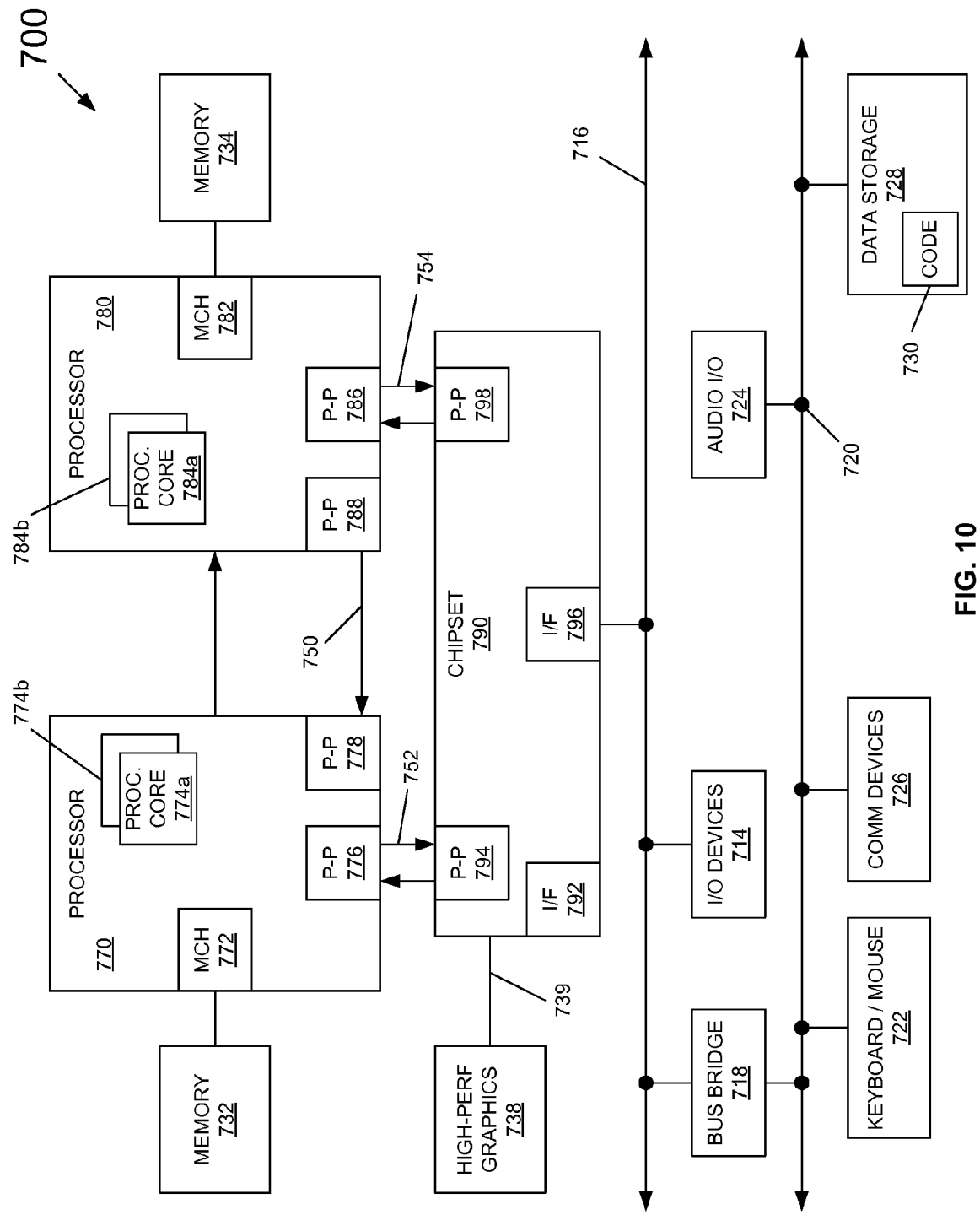
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, multiprocessor system 700 is a point-to-point interconnect system, and includes a first processor 770 and a second processor 780 coupled via a point-to-point interconnect 750. As shown in FIG. 10, each of processors 770 and 780 may be multicore processors, including first and second processor cores (i.e., processor cores 774a and 774b and processor cores 784a and 784b). Each of the processors can include a decode unit and an APIC or other logic to perform emulated MSI interrupt handling and to enable communication of inter-processor interrupts between the processors, as described herein.

Still referring to FIG. 10, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 10, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 10, chipset 790 includes P-P interfaces 794 and 798.

Furthermore, chipset 790 includes an interface 792 to couple chipset 790 with a high performance graphics engine 738, by a P-P interconnect 739. However, in other embodiments, graphics engine 738 can be internal to one or both of processors 770 and 780. In turn, chipset 790 may be coupled to a first bus 716 via an interface 796. As shown in FIG. 10, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smartphone, tablet computer, Ultrabook™, netbook, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first logic to store a write transaction including an interrupt and data received from a device coupled to the processor to a cache line of a cache memory based on an address in an address queue, and forward an address of the cache line and assert an emulated message signaling interrupt (MSI) signal to an interrupt controller of the processor;
the interrupt controller coupled to the first logic to obtain the data stored in the cache line responsive to the emulated MSI signal and to assign at least one interrupt vector of the data to a first core of the processor to cause the first core to handle the interrupt; and
the first core coupled to the interrupt controller and including at least one execution unit to perform operations responsive to an interrupt handler accessed via the at least one interrupt vector.

2. The processor of claim 1, wherein the first logic is to store the cache line address in the address queue including a plurality of entries each associated with an available cache line for storage of interrupt data, and remove the cache line address from the address queue responsive to storage of the write transaction in the cache line and to mark the cache line as used in a temporary storage.

3. The processor of claim 2, wherein the first logic is to store the cache line address in the address queue after the interrupt has been serviced.

4. The processor of claim 1, wherein the first logic is to receive the write transaction from the device as a posted write transaction including the at least one interrupt vector and interrupt data.

5. The processor of claim 1, wherein the cache line comprises a locked cache line pre-allocated to store a write transaction including a plurality of interrupts each having interrupt data and an interrupt vector.

6. The processor of claim 1, wherein the processor is to modify a second cache line of the cache memory including a plurality of interrupt vectors each associated with interrupt data, to remove a first portion of the interrupt vectors and the associated interrupt data for a first plurality of interrupts to be handled within the processor to obtain a modified cache line data.

7. The processor of claim 6, wherein the processor is to forward the modified cache line data as an inter-processor interrupt to a second processor coupled to the processor.

8. The processor of claim 1, wherein the processor is to assign a priority to each of a plurality of emulated MSI interrupts based on an address range of the cache memory.

9. The processor of claim 1, further comprising:
a first task state register to store a beginning location in the cache line at which the processor is to store state information on a switch to an interrupt handler to handle the interrupt associated with the emulated MSI signal; and a second task state register to store an end location in the cache line at which the processor is to store the state information.

10. The processor of claim 9, wherein responsive to receipt of the at least one interrupt vector from the interrupt controller, the first core is to store a current context to a portion of the cache line according to the beginning location and the end location obtained from the first and second task state registers.

11. The processor of claim 10, wherein after execution of the interrupt handler, the first core is to read the current context from the portion of the cache line according to the beginning location and the end location obtained from the first and second task state registers and to restore the current context to the first core.

12. An apparatus comprising:
a first core to execute instructions;
a second core to execute instructions;
a cache memory coupled to the first and second cores and including a plurality of cache lines, wherein a first portion of cache lines are to be locked for allocation to incoming write transactions from a plurality of devices coupled to the apparatus; and
a decode logic to store a write transaction received from a first device of the plurality of devices to a cache line of the first portion of cache lines, and assert an emulated message signaling interrupt (MSI) signal;
an interrupt controller to obtain data stored in the cache line responsive to the emulated MSI signal and to assign at least one interrupt vector of the write transaction to the first core.

13. The apparatus claim 12, further comprising a cache line address lookup table, the cache line address lookup table including a plurality of entries each to map a legacy interrupt line assigned to one of the plurality of devices to a cache line allocated to the device.

14. The apparatus of claim 13, wherein the decode logic is to assert an emulated legacy interrupt signal to the interrupt controller responsive to detection of a write transaction to a first cache line allocated to a first device assigned to a first legacy interrupt line.

15. The apparatus of claim 14, wherein the interrupt controller is to access the cache line address lookup table and identify a legacy interrupt line to map to a cache line associated with the emulated legacy interrupt signal.

16. The apparatus claim 15, further comprising a plurality of interrupt queues each associated with a legacy interrupt line, wherein the interrupt controller is to store the cache line address allocated to the device assigned to the legacy interrupt line in a corresponding one of the plurality of interrupt queues.

17. The apparatus of claim 16, wherein the interrupt controller is to obtain the cache line address from a first one of the plurality of interrupt queues, obtain an interrupt vector from the cache line having the cache line address, and assign the interrupt vector to the first core for handling.

18. The apparatus of claim 12, further comprising a lookup table to store an association between a device identifier of the first device of the plurality of devices coupled to the apparatus and a cache line address of the cache memory associated with the first device.

19. The apparatus of claim 18, wherein the device identifier comprises at least one of a-device identifier, a hardware identifier, and a list of interrupt vectors associated with the device.

20. The apparatus of claim 18, wherein the interrupt controller is to determine if an identifier received in a write transaction matches a device identifier stored in the lookup table, and if so obtain at least one interrupt vector from a corresponding cache line of the cache memory, and cause the first core to execute at least one interrupt service routine associated with the at least one interrupt vector.

21. The apparatus of claim 20, wherein the apparatus is to prevent a second write transaction from being stored in the corresponding cache line while the at least one interrupt service routine is being processed.

22. The apparatus of claim 18, wherein the interrupt controller is to prevent execution of an interrupt associated with a write transaction if an identifier received in the write transaction does not match a device identifier stored in the lookup table.

23. The apparatus of claim 12, wherein interrupt data stored in a first cache line is directly mapped to a plurality of driver parameters of a device driver.

24. A system comprising:
a first processor including a plurality of first cores and an interrupt controller coupled to a first cache memory to store a cache line including a plurality of interrupt vectors each associated with interrupt data, to remove a first portion of the interrupt vectors and the associated interrupt data for a first plurality of interrupts to be handled within the plurality of first cores to form a modified cache line data, and to forward the modified cache line data as an inter-processor interrupt to a second processor coupled to the processor;
the second processor coupled to the first processor and including at least one second core, a second cache memory to receive and store the modified cache line data, and a second interrupt controller to access the modified cache line data and to obtain at least one interrupt vector and corresponding data for an interrupt to be handled by the at least one second core; and
a dynamic random access memory (DRAM) coupled to the first and second processors.

25. The system of claim 24, wherein the first processor comprises a first logic to store a write transaction including an interrupt received from a device coupled to the first processor to a cache line of the first cache memory based on an address in an address queue, and forward an address of the cache line and assert an emulated message signaling interrupt (MSI) signal to the interrupt controller.

26. The system of claim 25, wherein the first processor comprises a first task state register to store a beginning location in a cache line at which the first processor is to store state information on a switch to an interrupt handler to handle the interrupt associated with the emulated MSI signal, and a second task state register to store an end location in the cache line at which the first processor is to store the state information.

27. The system of claim 26, wherein the first processor is to store a current context to a portion of the cache line according to the beginning location and the end location obtained from the first and second task state registers.

28. The system of claim 27, wherein the first processor is to obtain the current context from the portion of the cache line according to the beginning location and the end location obtained from the first and second task state registers and to restore the current context to the first core.

* * * * *

UNITED STATES PATENT AND TRADEMARK OFFICE
CERTIFICATE OF CORRECTION

PATENT NO. : 8,996,774 B2  
APPLICATION NO. : 13/534511  
DATED : March 31, 2015  
INVENTOR(S) : Yen Hsiang Chew Page 1 of 1

It is certified that error appears in the above-identified patent and that said Letters Patent is hereby corrected as shown below:

In the Specification

Column 1, line 3, please insert
--This invention was made with Government support under contract number HR0011-10-3-0007 awarded by the Department of Defense. The Government has certain rights in this invention.--

Signed and Sealed this
Twentieth Day of October, 2015

Michelle K. Lee
*Director of the United States Patent and Trademark Office*